Nov. 12, 1968 K. A. JENSEN Re. 26,490

BABY CARRIER APPARATUS

Original Filed Sept. 18, 1962 2 Sheets-Sheet 1

Knud A. Jensen
INVENTOR.

BY Murray Robinson
ATTORNEY

BABY CARRIER APPARATUS

Original Filed Sept. 18, 1962 2 Sheets-Sheet 2

Knud A. Jensen
INVENTOR

BY
Murray Robinson
ATTORNEY

United States Patent Office

Re. 26,490
Reissued Nov. 12, 1968

26,490
BABY CARRIER APPARATUS

Knud A. Jensen, Eldora, Iowa, assignor to Infanseat Company, Eldora, Iowa, a corporation of Iowa Original No. 3,171,687, dated Mar. 2, 1965, Ser. No. 224,898, Sept. 18, 1962. This application is a continuation of Ser. No. 484,513, Aug. 31, 1965. Application for reissue Oct. 31, 1966, Ser. No. 591,029
9 Claims. (Cl. 297—377)

Matter enclosed in heavy brackets [ ] appears in the original patent but forms no part of this reissue specification; matter printed in italics indicates the additions made by reissue.

*ABSTRACT OF THE DISCLOSURE*

*A baby carrier having back, sides and bottom, and a support stand attached thereto, the stand having inwardly bent ends while the back includes means for limiting motion of the bent ends relative to the back of the carrier.*

*Briefly stated, this invention concerns baby carriers having a shell or seat-like structure and a supporting stand therefor. While supporting stands are known in the prior art, difficulty has been encountered at the points of juncture between the stand and the rear of the stand, especially concerning the tips of the stand tending to extend into or stick an associated mattress and/or the user. This invention provides a barrier for such stand tips. The barrier may comprise a lateral extension from the shell back combined with a web to limit such stand tip, or, in another embodiment, a forwardly extending tunnel-like extension of a channel formed in the shell back.*

*This application is a continuation of Ser. No. 484,513, now abandoned, which was a continuation of Ser. No. 224,898, now U.S. Patent No. 3,171,687.*

[This invention pertains to baby carriers and more particularly to support stands therefore.]

The primary object of the invention is to prevent the pivot ends of a U-shaped frame forming part of a supporting stand from canting or cocking in the bearing apertures in the shell of a baby carrier, which might otherwise occur causing the mattress on the inside of the shell to be torn, or if there is no mattress, scratching the baby.

According to the invention the baby carrier includes a shell molded or cast of a single piece of plastic such as polyethylene or polystyrene or polyurethane, or polypropylene. The apertures appearing in the rear portion shell molded or cast of a single piece of plastic such as ing the shell away from the plane of the shell, leaving a hole between the shell body and the portion or web thus displaced. The aperture thus formed provides a bearing whose axial extent is only the thickness of the material of the shell, at least that is the length of the part of the bearing which fully encompasses the pivot. The web adjacent the bearing, while being of curved cross section, only partially encompasses the pivot. This would allow the pivot to cock in its bearing except that a second web is provided displaced in the opposite direction from the first web forming a partial bearing or guard around the remainder of the periphery of the pivot. There is no aperture between the second web and the shell at the end of the partial bearing so that there is formed a stop for the pivot. In order further to prevent cocking of the frame members, the U-shaped frames are connected by bearing blocks which fully encompass the frames without any gaps or splits.

Figure 1:
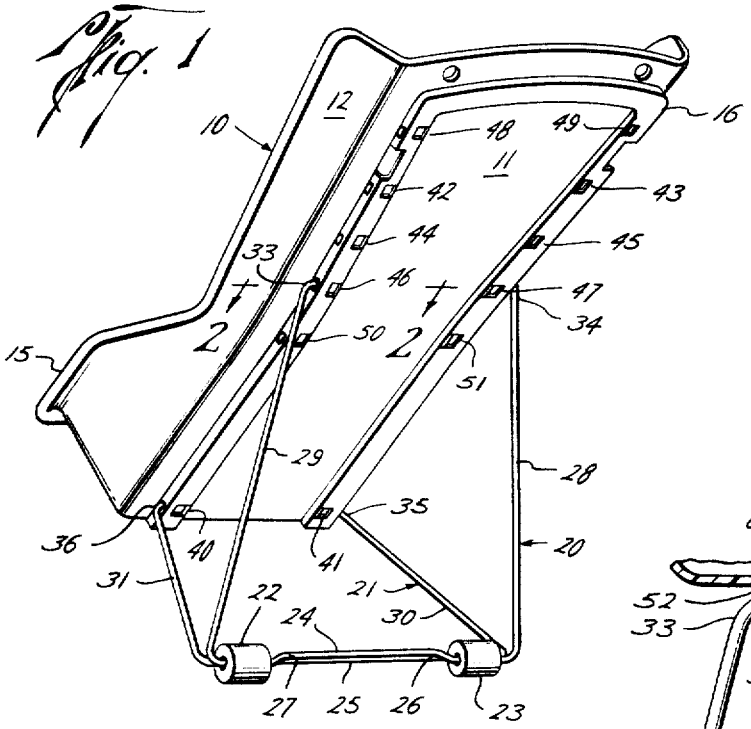
Figure 2:
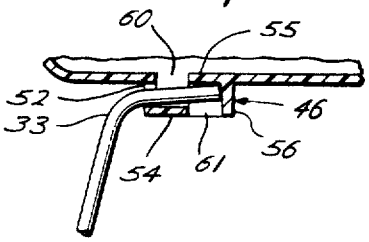
Figure 3:
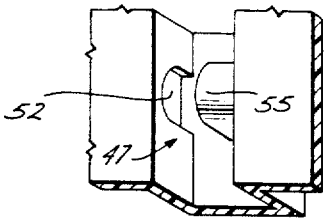
Figure 5:
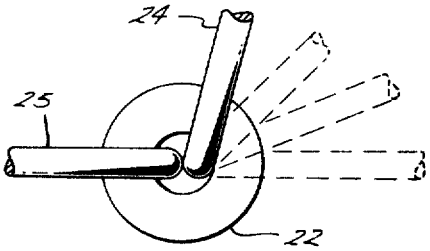
Figure 4:
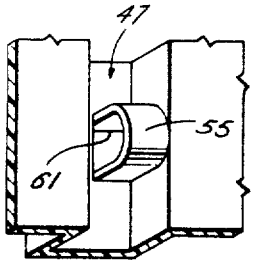
Figure 1A:
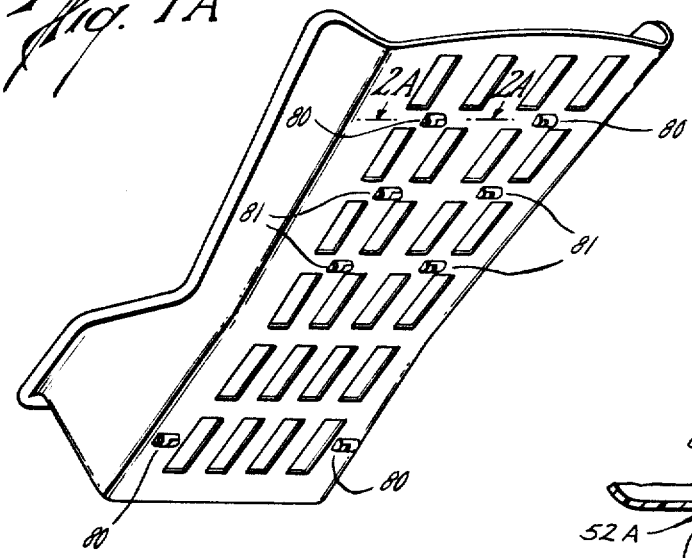
Figure 2A:
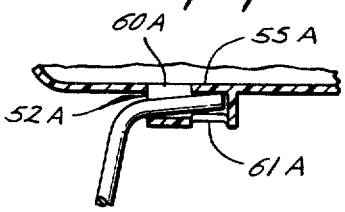
Figure 6:
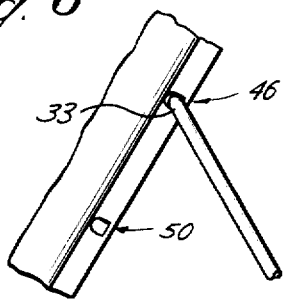
Figure 7:
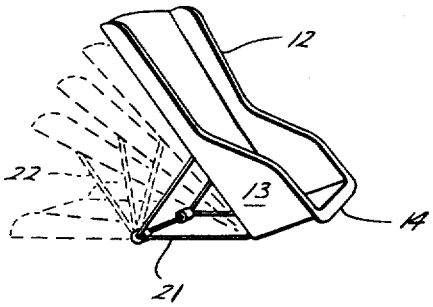
Figure 6A:
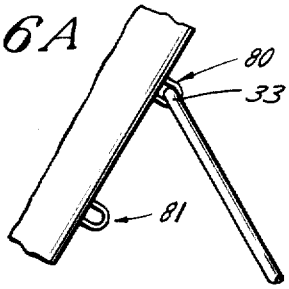

For a detailed description of the invention reference will now be made to the accompanying drawings wherein FIGURE 1 is a rear perspective view of the baby carrier and support stand therefore according to the invention, FIGURE 1A is a view similar to FIGURE 1 depicting a modification of the means of securing the pivot portion to the shell, FIGURE 2 is a sectional view taken along lines 2—2 of FIGURE 1 depicting the insertion of the inturned end into the securing means, FIGURE 2A is a sectional view similar to FIGURE 2, taken along lines 2A—2A of FIGURE 1A, depicting in detail the modification of FIGURE 1A, FIGURE 3 is a partial section depicting the bearing and channel member, FIGURE 4 is a view partially in section depicting the channel means used to prevent canting of the inturned ends, FIGURE 5 is a view of the frames inserted in the bearing blocks, same being an end view of the bearing block, FIGURE 6 is a partially broken away side view depicting the insertion of a frame member into the bearing, FIGURE 6A is a view similar to FIGURE 6 depicting the modification of FIGURES 1A and 2A, and FIGURE 7 is a perspective depicting the various adjustably achieved positions of the device.

Referring to FIGURE 1 there is shown a baby carrier including a shell 10, having a back 11, sides 12, and 13 (see also FIGURE 7), and bottom 14. A channel shaped flange 15 extends around the edge of the baby carrier at the sides and bottom thereof. A horseshoe shaped channel 16 is formed in the back of the shell. A pair of U-shaped frames 20 and 21 releasably and adjustably secured to the back of the shell provide a support stand therefore.

The frames are pivotally connected together by rubber bearing blocks 22 and 23 which fully encompass the center bars 24 and 25 thereof. These blocks have no splits or slots in the sides thereof, at least in their final form, any such slots originally provided for assembly being sealed thereafter by heat vulcanization or by a suitable cement.

The midportions 26 and 27 of the center bars are offset in the planes of the frames so as to retain the bearing blocks in position near the ends of the center bars and to be out of contact with the surface on which the stand is resting, and so as to lie flat against the back of the shell when the stand is placed flat there against when the shell is to be carried about.

Each frame includes a pair of substantially parallel side bars, namely a first pair 28 and 29 on frame 20, and a second pair 30, 31 on frame 21. The ends of the side bars are inturned, forming pivots 33, 34, 35, 36.

A pair of aligned bearing means 40 and 41 at the lower end of the back of the shell are adapted to be engaged by the pivots 35 and 36. A plurality of aligned pairs of bearing means, such as 42, 43; 44, 45; and 46, 47; are adapted to be engaged by the pivots 33 and 34. Additional pairs of aligned bearing means 48, 49; and 50, 51; serve a similar purpose. According to whether the pivots 33, 34 are in the uppermost or some lower pair of bearing means, the frames are flat against the back for storage or carrying the baby in the arms, or the frames are disposed at an angle to the shell of the carrier to support it at one of the angles as shown in FIGURE 7.

Referring to FIGURE 2, each pivot, for example pivot 33 there shown, passes through an aperture 52 between web 54 and the body of the shell, the walls of the aperture forming a bearing fully surrounding the pivot. The remainder of the web 54 forms a partial bearing rearwardly disposed relative to the body of the shell and the pivot. The *tunnel or wicket shaped* web 55, forwardly disposed relative to the pivot and the web 54 and the bottom of the channel 16 forms a partial bearing at the front side of the pivot. There is no aperture between the web 55 and the channel 16 so that the side 56 of the channel forms a stop for the pivot which presses thereagainst due to the resilience of the metal frame whose relaxed shape has less width than the width between the apertures.

The slot shaped openings 60, 61 adjacent the webs 54, 55 provide visual indication of the location of the apertures and of the position of the pivot tip from both the front and back of the shell.

It will be apparent that the webs 54 and 55 together form bearing means of considerable axial extent compared to the diameter of the pivot and extending all around the pivot so as to prevent canting thereof. This prevents canting or cocking of the pivot which might otherwise occur if the bearing means were limited to the sides of aperture 52 or even with only one web. The web 55 is especially important because it is at the end of the pivot and is forward disposed relative thereto so that it prevents the end of the pivot from poking the baby or catching or tearing the mattress which normally is disposed over the back and bottom of the shell at the front side thereof. This also gives added strength to the bearing means so that it will not easily break, an important feature with the more flexible plastic material.

While a preferred embodiment of the invention has been shown and described, many modifications thereof can be made by one skilled in the art without departing from the spirit of the invention [and it is intended to protect by Letters Patent all forms of the invention falling within the scope of the following claims].

One variation is shown in FIGURES 1–A, 2–A and 6–A. Wherein channel 16 is replaced by a plurality of bosses 80, 81, at the back of the shell, each adapted to receive a pivot such as 33. Each boss includes an aperture 52A, a web 54–A at the rear of the pivot, and a web 55–A at the front of the pivot, leaving slot 60–A at the front of shell and slot 61–A at the back. This is especially suitable for use with the shell shown in U.S. Patent 3,006,688.

I claim:

1. The combination of a baby carrier and a support-stand therefor wherein said supporting stand comprises a first resilient U-shaped frame member having a first pair of substantially parallel side bars connected at one end thereof by a first center bar and an inturned end forming a pivot on the other end of each of said first pair of side bars, a second resilient U-shaped frame member having a second pair of substantially parallel side bars, connected at one end thereof by a second center bar and an inturned end forming a pivot on the other end of each of said second pair of side bars, and a pair of spaced bearing blocks enclosing said first and second center bars;

said baby carrier comprising a back support having on its rearward side a plurality of aligned means for securing said inturned ends of said first and second U-shaped frame members to said back support, said aligned means including means to prevent canting of said inturned members.

2. An improvement in the fixing of a supporting stand to baby carrier comprising the combination of a back support for a baby carrier, said back support having a plurality of spaced transversely aligned means for securing a portion of a supporting frame to said back support, each of said aligned means consisting of a bearing for a portion of a supporting stand, a rearwardly disposed partial bearing adjacent to said bearing and a forwardly disposed partial bearing adjacent to said rearwardly disposed partial bearing, a supporting stand for said baby carrier comprising a pair of U-shaped frame members each having a pair of side bars connected at one end thereof by a center bar and having inturned ends forming pivots at the other end, the center bar of each of said frame members lying adjacent each other and being enclosed by a pair of bearing blocks, said inturned ends of said side bars being adapted to be inserted into and through said bearing, into and through said rearwardly disposed partial bearing and to come to rest adjacent said forwardly disposed partial bearing.

3. In a baby carrier having a back, sides and a bottom portion, the improvement consisting of a plurality of transversely aligned receiving means positioned on said back, each of said receiving means being adapted to receive portions of a support for said baby carrier, a support for said baby carrier including a plurality of inturned pivots, and each of said receiving means having means to prevent canting of the tip of said pivots, said means to prevent canting including a forwardly disposed bearing surface preventing forwardly movement of said inturned pivots, and means for limiting lateral motion of said pivots positioned adjacent to and inwardly with respect to said bearing surface.

4. An improvement in baby carriers having a back portion consisting of a channel portion on said back portion, a support stand used in conjunction with said baby carrier, said stand including side portions having pivot tips, a plurality of pivot receiving means on said back portion, each of said pivot receiving means including a pivot entrance aperture, means to limit forward movement of the tip of said pivot and means to limit lateral movement of the tip of said pivot said means to limit forward movement including a forwardly disposed bearing surface preventing forwardly motion of said pivots and said means to prevent lateral movement includes a rearwardly disposed stop member positioned adjacent to and inwardly of said forwardly disposed bearing surface.

5. An improvement in baby carriers having a back portion consisting of a support stand used in conjunction with said baby carriers, said stand including side portions having bent pivot tips, a plurality of pivot receiving means on said back portion, each of said pivot means to limit forward movement of the tip of said pivot and means to limit lateral movement of the tip of said pivot said means to limit forward movement including a forwardly disposed bearing surface preventing forwardly motion of said pivots and said means to limit lateral motion includes a stop member, said stop member being a rearwardly extension of said baby carrier back portion.

*6. In the combination of a baby carrier having a back, sides and a bottom portion, with a support stand therefor, the improvement consisting of:*

*said baby carrier shell having a channel-shaped portion encompassing the greater portion of said back, and a plurality of transversely aligned receiving means positioned by said channel-shaped portion, each of said receiving means including an aperture in said channel-shaped portion and adjacent wicket-configured means for preventing motion of a pivot-tip in a direction forwardly of said back; and*

*a support stand having a plurality of pivot tips for receipt by said receiving means thereby permitting said baby carrier shell to be supported and positioned by said stand.*

*7. In a device for positioning babies, the combination of:*

*a support stand having a plurality of bent pivot tips; and*

*a baby carrier having a back portion, said back portion having integral therein spaced, forwardly-opening, channel portions, said channel portions each including one of a plurality of transversely aligned pairs of pivot-tip receiving means, said receiving means including a wicket portion preventing forward motion of said pivot-tip.*

*8. The combination of claim 7 wherein each of said receiving means further include an aperture in one wall of said channel portion, the opposite wall being solid thereby barring lateral motion of said pivot-tip.*

*9. A baby carrier including the following:*

*a shell having a back, sides and bottom, said back having a portion thereof extending rearwardly of the remainder of said back, a plurality of apertures in said rearwardly extending portion, and wicket-shaped, pivot-tip limiting means adjacent each of said apertures; and*

*a support stand having a plurality of bent pivot tips, each of said tips being of such a size as to pass through one of said apertures, and to have its forwardly movement limited by said limiting means.*

References Cited

The following references, cited by the Examiner, are of record in the patented file of this patent or the original patent.

UNITED STATES PATENTS

| | | | |
|---|---|---|---|
| 3,028,042 | 4/1962 | Gottsegen | 220—95 |
| 889,982 | 6/1908 | Steinberg | 248—456 |
| 1,810,205 | 6/1931 | Gensmer | 248—453 |
| 2,563,671 | 8/1951 | Basinger | 248—456 |
| 2,777,138 | 1/1957 | Gallagher | 297—377 |
| 3,006,668 | 10/1961 | Quellette | 297—457 |
| 3,101,972 | 8/1963 | Laughlin | 297—377 |
| 3,171,687 | 3/1965 | Jensen | 297—377 |
| 1,986,935 | 1/1935 | Levine | 108—47 X |
| 2,966,319 | 12/1960 | Todish et al. | 248—165 X |

BOBBY R. GAY, *Primary Examiner.*

G. O. FINCH, *Assistant Examiner.*